3,239,482
FLAME RETARDANT COMPOSITIONS

Howard C. Rapp, Redwood City, Calif., assignor to Raychem Corporation, Redwood City, Calif., a corporation of California
No Drawing. Filed Mar. 18, 1963, Ser. No. 266,084
15 Claims. (Cl. 260—41)

The present application is a continuation-in-part of my copending application Serial No. 53,894, filed September 6, 1960.

This invention relates to plastic compositions and has particular reference to flameproof or flame-retardant resin compositions.

A primary object of the present invention is to provide new and improved flame-retardant plastic compositions and articles.

Heretofore, plastic flame-retardant systems have depended previously upon the inclusion of halogenated organic compounds such as highly chlorinated paraffin, hexahalocyclopentadiene, chlorinated benzene and the like, together with an inorganic oxide or salt such as antimony oxide, antimony-bismuth salts and the like. Such systems involve an interaction between the organic halide and the inorganic substance to produce a flame-snuffing or inhibiting action.

I have found that the essential mechanism of these systems is the production of an inorganic halide which volatilizes and combines with the free radicals produced during the combustion of the organic plastic material. Thus, the free radicals are prevented from propagating the burning reaction (similar to the retarding of oxidative degradation by the use of antioxidants) and the combustion stops. Of the metallic halides, antimony trifluoride appears to be the most effective. Other halides are also effective, such as antimony trichloride, bismuth tribromide, phosphorous pentafluoride, and, in general, halides of elements in Groups III, IV and V of the Periodic Table as set forth in the Handbook of Chemistry and Physics, page 393 (37th edition, 1955–1956), published by the Chemical Rubber Publishing Company.

These compounds are quite hygroscopic and/or corrosive, making them very difficult materials to incorporate into plastic compositions. Therefore, it is much more desirable to produce them as required in the compositions as products of other materials capable of reacting at the burning temperature of the plastic. As indicated above, this has been accomplished heretofore by reaction of an organic halide and inorganic material.

Such previously-proposed and used systems are, however, subject to certain disadvantages. For example, the organic additives lack adequate thermal stability upon exposure to high temperatures, and they are not resistant to radiation and hence are unsatisfactory for use in plastic compositions which are subjected to high energy or ionizing irradiation. A further object of the present invention, is therefore, to provide flame-retardant systems in plastic compositions which are not subject to the above and other disadvantages of the prior art.

A further object of the present invention is to provide novel cross-linked polyolefin plastic compositions having flame-retardant properties.

Other objects and advantages of the present invention it is believed will be readily apparent from the following detailed description of preferred embodiments thereof.

Briefly, this invention comprehends within its scope the discovery that effective flame-retardant plastics can be obtained by incorporating in the composition a wholly inorganic flame-retardant additive system to produce the desired flame-retardant inorganic halide at the burning temperature of the plastic. For example, the present invention may be practiced by the inclusion of an ammonium compound as one component in order to cause a flame-retardant reaction product to be produced at the flame temperature of the plastic. In this connection, for most plastics it is preferred that the flame-retardant components be capable of forming the reactive halide at temperatures below about 400° C. However, the ignition temperature of the material to be flame retarded and the environment in which the flame retarded material is to be used will also influence the choice of flame-retardant system.

One such system within the scope of this invention is ammonium fluoantimonite, which decomposes at 265° C. to form $NH_3$, $HF + SbF_3$. Another is a combination of ammonium fluoborate and antimony oxide. These react at 380° C. to form $NH_3$, $SbF_3$ and $B_2O_3$. The $SbF_3$ is the ultimate reaction product or the flame retardant as produced by either system. The double salt $$(NH_4)_2SO_4 \cdot 2SbF_3$$

functions as a very effective flame retardant, releasing $SbF_3$ in the combustion process.

I have also found that ammonium hexafluorophosphate decomposes at 325° C. to release $NH_3$, $HF + PF_5$, with the $PF_5$ functioning as a free radical stopper in the flame-retardant process, producing an effective flame-retardant.

A mixture of an ammonium halide and arsenic pentoxide forms arsenic trihalide which performs as a flame-retardant. The ammonium halide functions equally well with antimony trioxide, forming antimony trihalide.

Thus, it is within the scope of the present invention to use either one-component inorganic systems or multi-component inorganic systems to generate flame-retardant compositions. Specific embodiments of such systems are described in more detail in the following examples in which all parts are by weight unless otherwise indicated.

EXAMPLE 1

The efficiency of flame-retardant systems coming within the scope of the present invention was proved by mixing them into polyethylene, extruding the mixture as a 10 mil coating on a #20 AWG copper conductor and then subjecting the wire to the Horizontal Flame Test of Federal Specification J–C–98, Method 5211.

Compositions used and flame test results are set forth in the table below.

*Table 1*

| Composition | Percentage by weight | | | | | |
|---|---|---|---|---|---|---|
| Polyethylene | 100 | 70 | 80 | 80 | 80 | 70 |
| $NH_4BF_4$ | | 10(6) | | | | |
| $NH_4SbF_4$ | | | 20(12) | | | |
| $NH_4PF_6$ | | | | 20(15) | | |
| $NH_4Br$ | | | | | 10(8) | |
| $(NH_4)_2SO_4 \cdot SbF_3$ | | | | | 20(10) | |
| $Sb_2O_3$ | | 20(12) | | | | |
| $As_2O_3$ | | | | | | 20(16) |
| Time in seconds for flame to self-extinguish. | Continues to burn. | 10 (20) | 5 (15) | 15 (30) | 5 (10) | 15 (30) |

The figures in parentheses represent the least amount of ingredient that will render the composition self-extinguishing together with the burning time of this least amount mixture.

EXAMPLE 2

Mixtures of $NH_4BF_4$ and $Sb_2O_3$ were made up in the ratios shown with polyethylene (Hi-fax 1400E, manufactured by Hercules Powder Co.) as the base resin. These were extruded as an .010″ wall on #18 AWG tin coated copper, stranded 19 x 30. After extrusion the samples were irradiated 20 mr.

These were tested for flammability using the fixture, burner, side of flame and time of flame applications as described in Test J–C–98. For this test, the flame was applied at one end of the sample in the fixture and the time was determined for 6″ of flame travel along the wire specimen. Five samples of each composition were tested and the average burning times are indicated in Table 2.

Table 2

| Composition, percent | | | Time of burning (seconds) 6″ travel |
|---|---|---|---|
| Polyethylene | NH₄BF₄ | Sb₂O₃ | |
| 76 | 8 | 16 | (¹) |
| 82 | 6 | 12 | 125 |
| 88 | 4 | 8 | 115 |
| 94 | 2 | 4 | 93 |
| 97 | 1 | 2 | 87 |
| 98.5 | ½ | 1 | 87 |
| 100 | 0 | 0 | 78 |

¹ All samples self-extinguishing within 1″ and 30 sec. time.

EXAMPLE 3

Various flame-retardant systems coming within the scope of the present invention were tested as flame-retardants in polyethylene. The polyethylene used was DYNK which has a melt index of 0.2–0.04 and is manufactured by Union Carbide. The powdered components were milled into the polyethylene at 150° C. In every case, the weight of the material tested totaled 100 grams. Half of the samples consisted of 85 grams polyethylene and 15 grams flame-retardant system while the other half contained 70 grams polyethylene and 30 grams flame-retardant system. The components of the flame-retardant system were combined in stoichiometric amounts in each case. A control sample comprising 70 grams polyethylene and 30 grams talc was also tested.

In each case, slabs were formed having a thickness of 62 mils. Some of the slabs, as indicated in Table 3, were irradiated with high energy electrons from a 1 mev. electron generator to a dose of 20 megarads. The irradiated and unirradiated slabs were then examined for flammability in accordance with test ASTM–D–635, with the exception that three samples were tested rather than the ten prescribed in this test. The average time in seconds for the three samples to burn three inches is indicated in Table 3.

As shown in Table 3, 4 of the samples of the present invention is substantially superior to the unirradiated control. However, only certain flame-retardant systems performed better than the control when the samples were irradiated. Furthermore, it was found that certain systems appeared to perform better at lower concentrations, e.g., AlI₃, BiI₃, and LaBr₃ in the unirradiated samples and AlCl₃, BiI₃, LaBr₃ and TiBr₄ in the irradiated samples. It is, however, possible that the average deviation indicated in Table 3 could account for some of these results. In any event, this example establishes that flame-retardant systems of the present invention comprising oxides of metals from Groups III–A, IV–A, V–A, III–B, IV–B and V–B will operate to generate effective flame-retardant halides at flame temperature.

EXAMPLE 4

Among the one-component flame-retardant systems coming within the scope of the present invention are ammonium hexafluoroantimonate and sodium hexafluoroantimonate. The latter compound may be produced by reacting the former with sodium hydroxide or by reacting sodium hydroxide with hexafluoroantimonic acid. Samples were prepared with polyethylene in the same manner as that described in Example 3, with the exception that the irradiated samples were irradiated to a dose of 40 megarads. These samples were then tested as described in Example 3 and the results are indicated in Table 4.

Table 4

| Flame-retardant | Wt. percent of total | Burning rate (seconds) on 3″ length | |
|---|---|---|---|
| | | 0 mrad | 49 mrads |
| NH₄SbF₆ | 30 | 180±5 | 93±10 |
| NH₄SbF₆ | 15 | 180±3 | 82±6 |
| NaSbF₆ ᵃ | 30 | (ᵇ) | (ᶜ) |
| NaSbF₆ ᵃ | 15 | 162±23 | (ᶜ) |
| NaSbF₆ ᵈ | 30 | 137±10 | 102±12 |
| NaSbF₆ ᵈ | 15 | 130±5 | 96±3 |
| Talc (Control) | 30 | 90±7 | ᵉ 104±2 |

ᵃ From NH₄SbF₆+NaOH.
ᵇ Self-extinguishing, after 1″ mark.
ᶜ Self-extinguishing, before 1″ mark.
ᵈ From HSbF₆+NaOH.
ᵉ (20 mrads).

Table 3

| Flame-retardant species | From— | Expected Wt. of generated flame-retardant species/100 grams total polymer systems | Burning rate (seconds) on 3″ lengths | |
|---|---|---|---|---|
| | | | Unirradiated | 20 mrad |
| BF₃ and SbF₃ | NH₄BF₄ and Sb₂O₃ | (¹) | 207±38 | 101±7 |
| | | (²) | 143±18 | 98±4 |
| AlCl₃ | Al₂O₃ and MgCl₂ | 11.2 | 153±6 | 132±10 |
| | | 5.6 | 141±13 | 144±40 |
| AlBr₃ | Al₂O₃ and NaBr | 22.2 | 138±12 | 103±1 |
| | | 11.1 | 128±3 | 105±2 |
| AlI₃ | Al₂O₃ and KI | 22.8 | 146±10 | 123±1 |
| | | 10.3 | 164±2 | 109±3 |
| SnCl₄ | SnO₂ and NaCl | 20.6 | 178±8 | 107±4 |
| | | 10.3 | 110±5 | 98±6 |
| SnBr₄ | SnO₂ and CdBr₂ | 15.6 | 177±5 | 100±6 |
| | | 7.8 | 166±9 | 103±5 |
| SnI₄ | SnO₂ and NaI | 25.0 | 134±6 | 90±4 |
| | | 12.5 | 111±4 | 76±2 |
| SnF₄ | SnO₂ and LiF | 22.9 | 170±12 | 98±3 |
| | | 11.45 | 155±7 | 89±5 |
| BiCl₃ | Bi₂O₃ and MgCl₂ | 17.7 | 169±18 | 357±51 |
| | | 8.85 | 170±5 | 221±19 |
| BiI₃ | Bi₂O₃ and CaI₂ | 21.2 | 152±5 | 143±5 |
| | | 10.6 | 174±6 | 193±34 |
| BiI₃ | BiO₂ and NaI | 26.0 | 122±1 | 80±2 |
| | | 13.0 | 117±3 | 81±3 |
| LaBr₃ | La₂O₃ and KBr | 22.0 | 151±2 | 102±14 |
| | | 11.0 | 163±9 | 167±2 |
| LaF₃ | La₂O₃ and MgF₂ | 23.2 | 152±2 | 123±6 |
| | | 11.6 | 117±3 | 58±14 |
| TiBr₄ | TiO₂ and KBr | 19.9 | 146±10 | 101±8 |
| | | 9.95 | 112±9 | 110±13 |
| VOF₃ | V₂O₅ and LiF | 20.8 | 141±6 | 124±4 |
| | | 10.4 | 131±5 | 110±5 |
| Control | Talc | (³) | 90±7 | 104±2 |

¹ 30 g. of F.R. system, 70 g. of DYNK.
² 15 g. of F.R. system, 85 g. of DYNK.
³ 30 g. talc/100 g. system.

As in Example 3, it was found that all of the systems of Example 4 were substantially superior to the control in the unirradiated sample whereas only some of the irradiated samples were superior to the irradiated control.

Generally speaking about 5% or more of the inorganic flame-retardant additive or additive mixture based on the weight of the entire composition, is preferred for significant flame-inhibiting action. However, as shown in Example 2, less than 5% will produce substantial improvement in flame resistance and may be used where acceptable. The additive or additive mixture is preferably a minor proportion, i.e., less than 50% by weight, so as to minimize detrimental effects upon the physical properties of the molded or extruded articles produced from the plastic composition.

The flame-retardant systems of the present invention are particularly adapted for use in admixture with polyolefins such as linear and branched-chain polyethylene and polypropylene. The high temperature stability, radiation resistance and antirad properties of flame-retardant systems of the present invention make them especially suitable for use in polyolefins which are cross-linked by ionizing irradiation or by chemical means such as by peroxide. However, the resin constituent of the compositions of the present invention is not inherently so limited and includes any one or more of the following: polyesters, polystyrene, acrylic resins, epoxy resins, alkyds, elastomers such as copolymers of butadiene-styrene, butyl rubber, polysiloxane, natural rubber, polyisoprene, polychloroprene, copolymers of butadiene-acrylonitrile, and the like.

It will be readily apparent to those skilled in the art that flame-retardant systems other than those specifically identified in the foregoing examples come within the scope of the present invention. For example, the flame-retardant halide antimony trifluoride may be generated from systems comprising the combination of $Sb_2O_3$ with one or more of the following: $NH_4F$, $Ni(NH_3)_6(BF_4)_2$, $Zn(NH_3)_4(BF_4)_2$ and $NH_4PF_6$. Similarly, the flame-retardant halide boron trifluoride may be generated from one component systems comprising $Ni(NH_3)_6(BF_4)_2$ or $$Zn(NH_3)_4(BF_4)_2$$

The flame-retardant halide antimony trichloride may be generated from systems comprising the combination of $Sb_2O_3$ with $PNCl_2$. The flame-retardant $PX_5$, where X is a halogen, may be generated from $(PNX_2)_n$ where $n$ is greater than 1, e.g., 3 or 4. In general, any of the halogens may be substituted for those present in the specific embodiments disclosed herein. Similarly, elements from Groups III, IV and V may be substituted for those present in the specific embodiments of inorganic flame-retardant systems disclosed herein. However, since the environment in which the flame-retardant system of the present invention is to be used will have some influence on the choice of system, routine experimentation may be necessary to determine which system is most suitable for a given use.

Among the many uses of the flame-retardant composition of the present invention is as an insulating material for electrical components and wires.

Having fully described my invention, it is to be understood that I do not wish to be limited to the details set forth but my invention is of the full scope of the appended claims.

I claim:
1. A flame-retardant composition comprising a flammable polymer and a minor, flame-inhibiting amount of ammonium hexafluoroantimonate.

2. A flame-retardant composition comprising a flammable polymer and a minor, flame-inhibiting amount of sodium hexafluoroantimonate.

3. A flame-retardant composition comprising a flammable ploymer and a minor, flame-inhibiting amount of a flame-retardant system comprising ammonium fluoride and antimony oxide, said flame-retardant system being capable of generating antimony trifluoride.

4. A flame-retardant composition comprising a flammable polymer and a minor, flame-inhibiting proportion of a flame-retardant system comprising ammonium fluoborate and antimony oxide, said system being capable of generating antimony trifluoride.

5. A flame-retardant composition comprising a flammable polymer and a minor, flame-inhibiting amount of a flame-retardant system comprising antimony oxide and $Ni(NH_3)_6(BF_4)_2$, said system being capable of generating antimony trifluoride.

6. A flame-retardant composition comprising a flammable polymer and a minor, flame-inhibiting amount of a flame-retardant system comprising antimony oxide and $Zn(NH_3)_4(BF_4)_2$, said system being capable of generating antimony trifluoride.

7. A flame-retardant composition comprising a flammable polymer and a minor, flame-inhibiting amount of a flame-retardant system comprising antimony oxide and $PNX_2$, where X is a halogen, said system being capable of generating antimony trihalide.

8. A flame-retardant composition comprising a flammable polymer and a minor, flame-inhibiting amount of $Ni(NH_3)_6(BF_4)_2$.

9. A flame-retardant composition comprising a flammable polymer and a minor, flame-inhibiting amount of $Zn(NH_3)_4(BF_4)_2$.

10. A flame-retardant composition comprising a flammable polymer and a minor, flame-inhibiting amount of ammonium fluoantimonite.

11. A flame-retardant composition comprising polyethylene and a minor, flame-inhibiting amount of a flame retardant system comprising ammonium fluoborate and antimony oxide, said system being capable of generating antimony trifluoride.

12. A flame-retardant composition comprising a flammable polymer and a minor, flame-inhibiting amount of the double salt of ammonium sulfate and antimony trifluoride.

13. A flame-retardant composition comprising a flammable polymer and a minor, flame-inhibiting amount of ammonium hexafluorophosphate.

14. A flame-retardant composition comprising a flammable polymer and a minor, flame-inhibiting amount of a flame-retardant system comprising an ammonium halide and arsenic pentoxide, said system being capable of generating arsenic trihalide.

15. An insulated wire, said insulation comprising polyethylene containing a minor, flame-inhibiting amount of a flame-retardant system comprising ammonium fluoborate and antimony oxide, said system being capable of generating antimony trifluoride.

References Cited by the Examiner

UNITED STATES PATENTS

| 2,480,298 | 8/1949 | Happoldt | 260—41 |
| 2,668,784 | 2/1954 | Dillis | 117—138 |
| 2,799,556 | 7/1957 | Sullivan | 23—59 |
| 2,823,145 | 2/1958 | Clare | 117—138 |
| 2,948,641 | 8/1960 | McCluer | 106—15 |
| 3,113,118 | 12/1963 | Canterino | 260—41 |

OTHER REFERENCES

Renfrew et al.: Eds., Polythene, 2nd ed., Interscience, New York, 1957.

Little: "Flame Proofing Textile Fabrics," 1947, Reinhold Pub. Corp., New York (pp. 77).

MORRIS LIEBMAN, *Primary Examiner.*

K. B. CLARKE, J. S. WALDRON, *Assistant Examiners.*